Patented Mar. 24, 1953

2,632,742

UNITED STATES PATENT OFFICE 2,632,742

FIRE-RESISTANT COATING COMPOSITION AND METHOD OF MAKING THE SAME

Lewis W. Eckert, Lancaster Township, Lancaster County, Pa., assignor to Armstrong Cork Company, Lancaster, Pa., a corporation of Pennsylvania No Drawing. Application January 19, 1952,
Serial No. 267,309

16 Claims. (Cl. 260—17.3)

This invention relates to a fire-resistant coating composition for fiberboard and the like and to a method of making the same. Such coating compositions are desirable on fiberboard acoustical units and other members which are used in building constructions, such as panel, plank, and tile elements which are installed as decorative interior finishes.

It is generally recognized that fiberboard and similar insulating materials made from organic fibers such as ground wood are capable of supporting combustion and burn readily when ignited. In order to prevent the propagation or spread of flame, it is desirable to provide a coating on the exposed surface of the fiberboard which will not be readily ignitible and which will intumesce upon the application of a flame, forming a heat-insulating carbon deposit which will prevent the transfer of heat to the body of the board, preventing its ignition. In acoustical materials, where closely spaced circular openings are provided which extend from the surface of the board inwardly, the problem of rendering such product resistant to fire is particularly acute, for it is necessary that a substantial intumescence of the coating occur in order that it effectively bridge the openings in the board and prevent burning within the openings.

Since these fiberboard units generally have one surface exposed in the interior of a room, it is desirable to have the fire-resistant coating composition be capable of pigmentation and smooth application to provide an attractive, decorative surface.

An object of the present invention is to provide a coating composition for use on fiberboard and the like which will not support combustion but which will intumesce to a substantial extent upon the application of a flame, forming an insulating carbon layer and protecting the fiberboard or the like to which it is applied against ignition temperatures.

A further object of the invention is to provide a coating composition of the type described which will adhere well to the surface to which it is applied and will provide a crack-free, decorative surface.

A more specific object of the invention is to provide a fire-resistant coating composition for use on perforated fiberboard acoustical units which will possess the characteristic of intumescing to a degree sufficient to adequately bridge the perforations to prevent ignition of the acoustical unit upon application of a flame.

Another object of the invention is to provide a method whereby an improved fire-resistant coating of the type described may be made.

Other objects of the invention will become apparent from the description of a specific embodiment of the invention which follows.

According to the present invention, there are combined a degradation product of starch, obtained by heating the starch with a phosphate such as monoammonium phosphate or diammonium phosphate or mixtures thereof, a dicyandiamide-aldehyde resin, and phosphoric acid. The resin which is preferably formed in the presence of the phosphoric acid intumesces to an unusual degree upon the application of a flame; and this, combined with the intumescence of the starch, produces a total intumescence of the coating composition which is adequate to protect perforated fiberboard acoustical units with only a single relatively thin application of the coating composition to the surface of the units. The phosphate which is employed in the degradation of the starch serves to fireproof the starch, and the phosphoric acid fireproofs the resin. The coating resulting from the application of the composition thus will not ignite nor support combustion.

The following is an example of a fire-resistant coating composition suitable for application to fiberboard:

Example I

| | Parts by weight |
|---|---|
| Degraded starch solution: | |
| Starch | 356 |
| Diammonium phosphate | 354 |
| Water | 443 |
| Resin solution: | |
| Formaldehyde (37% solution) | 242 |
| Dicyandiamide | 75 |
| 85% phosphoric acid | 25 |
| Coating composition: | |
| Degraded starch solution | 1143 |
| Resin solution | 343 |
| Pigment | 123 |
| Filler | 92 |
| Water | 253 |

In the manufacture of the coating composition the starch, diammonium phosphate, and water are mixed together and heated to a temperature between 170° F. and 200° F. This results in the degradation of the starch and a concomitant reduction in viscosity of the solution. The application of heat is then discontinued.

In the preparation of the resin solution, the formaldehyde and dicyandiamide are mixed together for about two minutes, and then the 85% phosphoric acid is added. It serves as an acid catalyst. The reaction between the formaldehyde and dicyandiamide is continued until a clear solution is obtained. The reaction vessel is jacketed, and cooling water is applied to maintain the temperature of the reaction below about 120° F., and preferably at a temperature of about 98° F. to 105° F. With a batch such as given in Example I, the reaction will be effected in about one hour's time.

The starch solution while at a temperature of about 140° F. to 150° F. is mixed with the resin solution which is held at a temperature of about 100° F. to 120° F. Thereafter, the pigment and filler are added, together with the requisite quantity of water to provide the desired viscosity or body for application. This will vary, depending upon whether the coating composition is to be applied with a spray gun, a roll coater, or a brush.

The preferred starch is converted coating starch, a chlorinated starch such as Pennick and Ford Company's T. S. C. starch. Other so-called "thin boiling starches" may be substituted. Pearl starch may be used where the coating is to be applied by brush or by roll coater; but, for spray application, such starch is generally too viscous without substantial reduction in the solids content of the coating composition obtained by the addition of water. This may be objectionable in some instances, and for this reason the thin boiling starches are preferred. Mixtures of thin boiling starch and pearl starch may be used.

In place of diammonium phosphate, monoammonium phosphate or mixtures of the two may be used.

Generally, the ratio of starch to phosphate will fall within the range of 80 to 120 parts of starch for each 100 parts of phosphate by weight. About equal proportions give optimum results.

Dicyandiamide is an essential ingredient of the resin solution; but in place of formaldehyde, other aldehyde-yielding substances may be substituted; such, for example, as acetaldehyde, paraformaldehyde, benzaldehyde, and hexamethylenetetramine; and the term "aldehyde" is used in the claims to cover all such aldehyde-yielding substances.

It is preferred to use phosphoric acid as the reaction catalyst for the dicyandiamide-formaldehyde resin because it serves a triple function, i. e., it acts as an acid catalyst, it fireproofs the resin, and it imparts intumescent qualities to the completed resin. Other catalysts may be used to facilitate resin formation, and the phosphoric acid may be subsequently added. The reaction which occurs between the resin and the phosphoric acid which causes the product to intumesce upon the application of a flame is not known. It appears, however, to be specific to the combination including phosphoric acid.

The proportioning of dicyandiamide to formaldehyde preferably should be within the range of 1 mol of dicyandiamide to 2 to 3 mols of formaldehyde. An excess of aldehyde may be present without deleterious results, but there should be adequate aldehyde in the reaction mixture to combine with substantially all of the dicyandiamide.

The amount of phosphoric acid to be used is not critical. Preferably, it is incorporated in the range of 10 to 100 parts for each 100 parts by dry weight of dicyandiamide-aldehyde resin. More phosphoric acid may be incorporated, but it is not essential for best results. For uses such as on perforated fiberboards, about 12 parts of phosphoric acid for each 100 parts of dicyandiamide-aldehyde resin, dry basis, is desirable, as given in Example I; but for other uses, a lesser amount of phosphoric acid may be used.

The ratio of starch solution to resin solution is not critical. The resin serves primarily as an intumescent, fire-resistant binder for the starch-phosphate mixture. Therefore, the minimum quantity will be that necessary to adequately bind the composition. Because it is fire-resisting and intumescent, a high proportion of the resin may be incorporated with the starch-phosphate mixture. On a dry basis, the preferred range is between 16 to 100 parts of resin for each 100 parts of starch-phosphate mixture.

A titanium dioxide pigment may be used in the above example to produce a paint of white color. A diatomaceous earth filler may be used, since it is porous and facilitates drying of the coating composition. Any inorganic pigments and fillers may be substituted; and where a decorative surface is not essential, the fillers and pigments may be eliminated.

The above coating composition is particularly suitable for spray application; and when about 16 grams dry weight of the composition are applied per square foot to an insulating fiberboard, such as one made from ground southern pine, the board will meet the requirements of Section E3c Federal Specification SSA–118a, dated February 12, 1948, and entitled "Acoustical Units: Prefabricated," when tested in accordance with the procedure outlined in Section F3c of the specification. The coating when applied to perforated acoustical units does not substantially reduce the sound-absorption efficiency of the product. The coating is generally applied by spray or roll coater and may be dried at a temperature in the order of 325° F. The dried surface is tack-free, smooth, and free of checks or cracks.

This application is a continuation-in-part of my copending application Serial No. 177,760, filed August 4, 1950, and entitled "Fire-Resistant Coating Composition and Method of Making the Same," now abandoned.

I claim:

1. A fire-resistant coating composition for fiberboard and the like comprising a mixture of (1) the heat degradation product of (a) an amylaceous material selected from the group consisting of thin boiling starch, pearl starch, and mixtures thereof and (b) a phosphate selected from the group consisting of monoammonium phosphate, diammonium phosphate, and mixtures thereof, obtained by heating the starch-phosphate mixture to a temperature between 170° F. and 200° F., (2) a dicyandiamide-aldehyde resin, and (3) phosphoric acid.

2. A fire-resistant coating composition for fiberboard and the like comprising a mixture of (1) the heat degradation product of (a) chlorinated starch and (b) a phosphate selected from the group consisting of monoammonium phosphate, diammonium phosphate, and mixtures thereof, obtained by heating the starch-phosphate mixture to a temperature between 170° F. and 200° F., (2) a dicyandiamide-aldehyde resin, and (3) at least 10 parts of phosphoric acid for each 100 parts by dry weight of resin.

3. A fire-resistant coating composition for fiberboard and the like comprising a mixture of (1) the heat degradation product of (a) an amylaceous material selected from the group consisting of thin boiling starch, pearl starch, and mixtures thereof and (b) a phosphate selected from the group consisting of monoammonium phosphate, diammonium phosphate, and mixtures thereof, obtained by heating the starch-phosphate mixture to a temperature between 170° F. and 200° F., (2) a dicyandiamide-aldehyde resin, (3) phosphoric acid, and (4) an inorganic pigment.

4. A fire-resistant coating composition for fiberboard and the like comprising a mixture of (1) the heat degradation product of (a) an amylaceous material selected from the group consisting of thin boiling starch, pearl starch, and mixtures thereof and (b) a phosphate selected from the group consisting of monoammonium phosphate, diammonium phosphate, and mixtures thereof, obtained by heating the starch-phosphate mixture to a temperature between 170° F. and 200° F., (2) a dicyandiamide-aldehyde resin, (3) phosphoric acid, (4) an inorganic pigment, and (5) a porous inorganic filler.

5. A fire-resistant coating composition for fiberboard and the like comprising a mixture of (1) the heat degradation product of (a) chlorinated starch and (b) diammonium phosphate, obtained by heating the starch-phosphate mixture to a temperature between 170° F. and 200° F., (2) a dicyandiamide-formaldehyde resin, and (3) phosphoric acid.

6. A fire-resistant coating composition for fiberboard and the like comprising a mixture of (1) a dicyandiamide-aldehyde resin, (2) 1 to 6 parts by dry weight of the heat degradation product of (a) chlorinated starch and (b) a phosphate selected from the group consisting of monoammonium phosphate, diammonium phosphate, and mixtures thereof, obtained by heating the starch-phosphate mixture to a temperature between 170° F. and 200° F. for each part by dry weight of said resin, and (3) at least .10 part by weight of phosphoric acid for each part by dry weight of said resin.

7. A fire-resistant coating composition for fiberboard and the like comprising a mixture of (1) about 2 parts of the heat degradation product of (a) about 1 part of chlorinated starch and (b) about 1 part diammonium phosphate, obtained by heating the starch-phosphate mixture to a temperature between 170° F. and 200° F., (2) about .9 part dicyandiamide-aldehyde resin, (3) a pigment, (4) a porous filler, and (5) a liquid vehicle.

8. A process of making a coating composition for fiberboard and the like comprising heating together to a temperature between 170° F. and 200° F. a water dispersion of an amylaceous material selected from the group consisting of thin boiling starch, pearl starch, and mixtures thereof, and a phosphate selected from the group consisting of monoammonium phosphate, diammonium phosphate, and mixtures thereof to degrade such starch and reduce the viscosity of the starch-phosphate mixture and combining with such degradation product a dicyandiamide-aldehyde resin and phosphoric acid.

9. A process of making a coating composition for fiberboard and the like comprising heating together to a temperature between 170° F. and 200° F. a water dispersion of chlorinated starch and a phosphate selected from the group consisting of monoammonium phosphate, diammonium phosphate, and mixtures thereof to degrade said chlorinated starch and reduce the viscosity of the starch-phosphate mixture and combining with such degradation product a dicyandiamide-formaldehyde resin and phosphoric acid.

10. A process of making a coating composition for fiberboard and the like comprising heating together to a temperature between 170° F. and 200° F. a chlorinated starch and a phosphate selected from the group consisting of monoammonium phosphate, diammonium phosphate, and mixtures thereof to degrade said starch and reduce the viscosity of the mixture and combining with said mixture a dicyandiamide-aldehyde resin and phosphoric acid.

11. A process of making a coating composition for fiberboard and the like comprising heating together to a temperature between 170° F. and 200° F. a water dispersion of chlorinated starch and a phosphate selected from the group consisting of monoammonium phosphate, diammonium phosphate, and mixtures thereof until said chlorinated starch has been degraded and the viscosity of the solution reduced, reacting dicyandiamide and aldehyde in the presence of phosphoric acid, and combining the reaction product with the degraded starch solution.

12. A process of making a coating composition for fiberboard and the like comprising heating together to a temperature between 170° F. and 200° F. a water dispersion of 1 to 6 parts by dry weight of the degradation product of chlorinated starch and a phosphate selected from the group consisting of monoammonium phosphate, diammonium phosphate, and mixtures thereof with 1 part by dry weight of a dicyandiamide-aldehyde resin and at least .10 part of phosphoric acid for each part by dry weight of resin.

13. A process of making a coating composition for fiberboard and the like comprising heating together to a temperature between 170° F. and 200° F. a water dispersion of 1 to 6 parts by dry weight of the degradation product of .8 to 1.2 parts of chlorinated starch to 1 part of a phosphate selected from the group consisting of monoammonium phosphate, diammonium phosphate, and mixtures thereof with 1 part by dry weight of a dicyandiamide-aldehyde resin and .10 to 1 part by weight of phosphoric acid for each part by dry weight of resin.

14. A process of making a coating composition for fiberboard and the like comprising heating together to a temperature between 170° F. and 200° F. the following ingredients in about the recited parts by weight:

| | |
|---|---|
| An amylaceous material selected from the group consisting of thin boiling starch, pearl starch, and mixtures thereof | 356 |
| Diammonium phosphate | 354 |
| Water | 443 | mixing the degraded starch solution so formed with the following resin solution obtained by reacting the ingredients in about the recited parts by weight at temperatures of about 90° F. to 105° F.:

| | |
|---|---|
| Formaldehyde | 242 |
| Dicyandiamide | 75 |
| 85% Phosphoric acid | 25 |

15. A fire-resistant coating composition in accordance with claim 1 in which the amylaceous material comprises pearl starch.

16. A fire-resistant coating composition in accordance with claim 1 in which the amylaceous material comprises a thin boiling starch.

LEWIS W. ECKERT.

REFERENCES CITED

The following references are of record in the file of this patent:

UNITED STATES PATENTS

| Number | Name | Date |
|---|---|---|
| 2,452,054 | Jones | Oct. 26, 1948 |